United States Patent [19]

Mahoney

[11] Patent Number: 4,625,549
[45] Date of Patent: Dec. 2, 1986

[54] OPTICAL FLUID LEVEL INDICATOR INCLUDING FLOAT WITH REFLECTING MEANS

[75] Inventor: J. Michael Mahoney, Bristol, Wis.

[73] Assignee: Outboard Marine Corporation, Waukegan, Ill.

[21] Appl. No.: 761,542

[22] Filed: Aug. 1, 1985

[51] Int. Cl.⁴ .................. G01F 23/02; G01F 23/34
[52] U.S. Cl. ................................ 73/327; 73/307; 116/228; 250/577
[58] Field of Search .............. 73/327, 293, 307, 308; 116/228; 250/577

[56] References Cited

U.S. PATENT DOCUMENTS

| | | | |
|---|---|---|---|
| 461,370 | 10/1891 | Seidensticker | 73/327 |
| 2,468,833 | 5/1949 | Murphy | 116/118 |
| 2,512,757 | 6/1950 | Westall | 136/182 |
| 2,616,941 | 11/1952 | Lasko | 136/182 |
| 2,731,938 | 1/1956 | Eagon | 116/118 |
| 3,498,141 | 3/1970 | Nelson et al. | 73/319 |
| 3,570,311 | 3/1971 | Nelson | 73/327 |
| 4,187,025 | 2/1980 | Harmer | 250/577 X |
| 4,358,960 | 11/1982 | Porter | 250/577 X |

Primary Examiner—Daniel M. Yasich
Attorney, Agent, or Firm—Michael, Best & Friedrich

[57] ABSTRACT

An optical fluid level indicator comprising a light transmitting member having a longitudinal axis, an upper end, and a lower end adapted to extend into a fluid container, the lower end including a first surface having a shape, and a portion projecting downwardly from the first surface and forming a second surface spaced beneath the first surface and having a shape, and a float member having mounted thereon a light reflecting disc and being connected to the lower end of the light transmitting member for movement relative to the light transmitting member in the direction of the longitudinal axis and between a first position wherein the light reflecting disc is adjacent the second surface so that light transmitted to the second surface is reflected by the light reflecting disc, thereby causing appearance at the upper end of the light transmitting member of a light area having the shape of the second surface surrounded by a dark area having the shape of the first surface, and a second position wherein the light reflecting disc is spaced below the second surface, thereby causing appearance at the upper end of the light transmitting member of uniform coloration.

15 Claims, 8 Drawing Figures

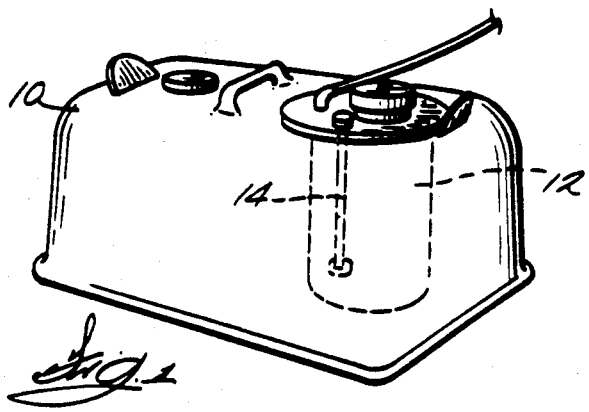
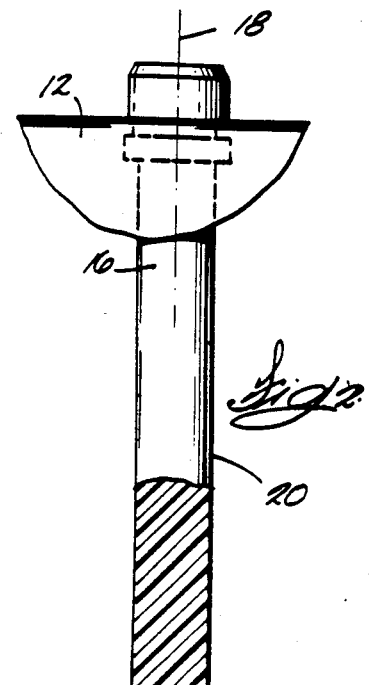
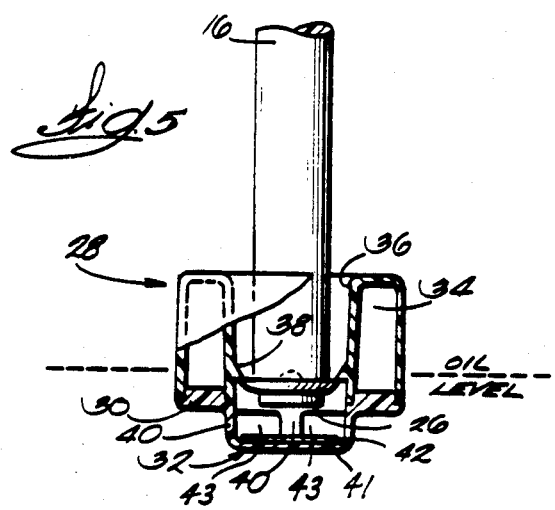
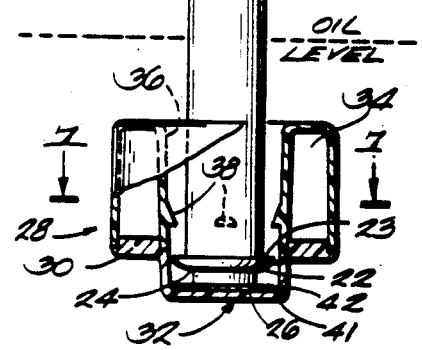

OPTICAL FLUID LEVEL INDICATOR INCLUDING FLOAT WITH REFLECTING MEANS

BACKGROUND OF THE INVENTION

The invention relates to optical fluid level indicators, and more particularly to optical fluid level indicators used in fuel or oil containers.

Attention is directed to the following U.S. patents which disclose optical fluid level indicators:
Nelson U.S. Pat. No. 3,570,311—Mar. 16, 1971
Nelson U.S. Pat. No. 3,498,141—Mar. 3, 1970
Eagon U.S. Pat. No. 2,731,938—Jan. 24, 1956
Lasko U.S. Pat. No. 2,616,941—Nov. 4, 1952
Westall U.S. Pat. No. 2,512,757—June 27, 1950
Murphy U.S. Pat. No. 2,468,833—May 3, 1949
Seidensticker U.S. Pat. No. 461,370—Oct. 13, 1981

SUMMARY OF THE INVENTION

The invention provides an optical fluid level indicator comprising a light transmitting member having a first end, and a second end adapted to extend into a fluid container, and float means movably connected to the light transmitting member adjacent the second end for reflecting from the second end light entering the first end when fluid in the fluid container is at a predetermined level, and for permitting dispersion at the second end of light entering the first end when the fluid is at a level lower than the predetermined level.

In one embodiment, the light transmitting member has a longitudinal axis, and the float means includes a float member, and light reflecting means mounted on the float member, the float member being connected to the light transmitting member for movement relative to the light transmitting member in the direction of the longitudinal axis and between a first position wherein the light reflecting means is adjacent the second end of the light transmitting member so that light entering the first end of the light transmitting member is reflected from the second end by the light reflecting means, and a second position wherein the light reflecting means is spaced from the second end so that light entering the first end is dispersed at the second end.

In one embodiment, the light reflecting means includes a chrome plated surface.

In one embodiment, the light transmitting member extends generally vertically and includes a generally cylindrical outer surface, and an annular flange extending outwardly from the outer surface adjacent the second end and having an upper surface, and the float member includes a generally cylindrical inner surface forming a cylindrical bore receiving the light transmitting member, a plurality of projections extending inwardly from the inner surface and having lower surfaces engageable with the upper surface of the light transmitting member flange to limit downward movement of the float member relative to the light transmitting member, and an open portion supporting the light reflecting means and allowing fluid to flow between the light reflecting means and the second end of the light transmitting member when the light reflecting means is spaced from the second end.

In one embodiment, the second end of the light transmitting member includes a lower surface generally perpendicular to the longitudinal axis, and the light reflecting means includes a light reflecting surface extending generally perpendicularly to the longitudinal axis.

The invention also provides an optical fluid level indicator comprising a light transmitting member having a longitudinal axis, an upper end, and a lower end adapted to extend into a fluid container, and a float member having mounted thereon light reflecting means and being connected to the lower end of the light transmitting member for movement relative to the light transmitting member in the direction of the longitudinal axis and between a first position wherein the light reflecting means is adjacent the lower end of the light transmitting member so that light entering the upper end of the light transmitting member is reflected from the lower end by the light reflecting means, and a second position wherein the light reflecting means is spaced from the lower end so that light entering the upper end is dispersed at the lower end.

The invention also provides an optical fluid level indicator comprising a light transmitting member having a longitudinal axis, an upper end, and a lower end adapted to extend into a fluid container, the lower end including a first surface having a shape, and a portion projecting downwardly from the first surface and forming a second surface spaced beneath the first surface and having a shape, and a float member having mounted thereon light reflecting means and being connected to the lower end of the light transmitting member for movement relative to the light transmitting member in the direction of the longitudinal axis and between a first position wherein the light reflecting means is adjacent the second surface so that light transmitted to the second surface is reflected by the light reflecting means, thereby causing appearance at the upper end of the light transmitting member of a light area having the shape of the second surface surrounded by a dark area having the shape of the first surface, and a second position wherein the light reflecting means is spaced below the second surface, thereby causing apperance at the upper end of the light transmitting member of uniform coloration.

A principal feature of the invention is the provision of an optical fluid level indicator comprising a light transmitting member having a lower end including a first surface having a shape, and a portion projecting downwardly from the first surface and forming a second surface spaced beneath the first surface and having a shape different from or smaller than the shape of the first surface, and a float member having mounted thereon light reflecting means and being connected to the lower end of the light transmitting member for movement between a first position wherein the light reflecting means is adjacent or in engagement with the second surface, and a second position wherein the light reflecting means is spaced below the second surface.

Other principal features and advantages of the invention are set forth in the following detailed description, claims, and drawings.

DESCRIPTION OF THE DRAWINGS

FIG. 1 is a perspective view of a combined fuel and oil tank including an optical fluid level indicator embodying the invention.

FIG. 2 is a side elevational view, partially in cross-section, of the fluid level indicator with the float member in the upper position.

FIG. 3 is a top view of the fluid level indicator as shown in FIG. 2.

FIG. 4 is a bottom view of the fluid level indicator.

FIG. 5 is a partial side elevational view of the fluid level indicator with the float member in the lower position.

FIG. 6 is a top view of the fluid level indicator as shown in FIG. 5.

FIG. 7 is a cross-sectional view taken along lines 7—7 in FIG. 2.

FIG. 8 is a bottom view of the light transmitting member.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A combined fuel and oil tank 10 usable in connection with, for example, an outboard motor is illustrated in FIG. 1. An example of such a combined fuel and oil tank is disclosed in U.S Baars Patent Application Ser. No. 700,550, filed Feb. 11 1985 and now Patent No. 4,594,970. The combined fuel and oil tank 10 includes an oil storing, oil pumping, and fuel/oil mixing assembly 12 having mounted therein an optical fluid level indicator 14 embodying the invention.

The fluid level indicator 14 is mounted on the upper wall of the assembly 12 as shown in FIGS. 1 and 2 and extends downwardly into the assembly 12 for indicating the level of the oil therein. As best shown in FIG. 2, the fluid level indicator 14 comprises a light transmitting member or rod 16 having a first or upper end mounted on the upper wall of the assembly 12, and a second or lower end extending into the assembly 12. Preferably, the light transmitting member 16 is made of clear acrylic. In the preferred embodiment, the light transmitting member 16 extends generally vertically and has a generally vertical longitudinal axis 18.

Furthermore, in the preferred embodiment, the light transmitting member 16 includes a generally cylindrical outer surface 20, and an annular flange 22 having an upper surface 23 and extending outwardly from the outer surface 20 adjacent the lower end of the light transmitting member 16. Also, the lower end of the light transmitting member 16 includes (see FIGS. 2 and 8) a first or upper surface 24 having a shape, and a portion projecting downwardly from the first or upper surface and forming a second or lower surface 26 spaced beneath the upper surface 24 and having a shape different from or smaller than the shape of the upper surface 24. In the preferred embodiment, the first or upper surface 24 has a generally circular periphery, and the second or lower surface 26 has the shape of an oil drop, as best shown in FIG. 8.

The fluid level indicator 14 also comprises float means 28 movably connected to the light transmitting member 16 adjacent the lower end for reflecting, from the lower end, light entering the upper end when the oil in the assembly 12 is at a predetermined level, and for permitting dispersion, at the lower end, of light entering the upper end when the oil is at a level lower than the predetermined level. While various suitable float means 28 can be employed, in the preferred embodiment, the float means 28 includes a float member 30 having mounted thereon light reflecting means and being connected to the light transmitting member 16 for vertical movement relative to the light transmitting member 16 and between a first or upper position wherein the light reflecting means is adjacent or in engagement with the lower end of the light transmitting member 16, so that light entering the upper end of the light transmitting member 16 is reflected from the lower end by the light reflecting means, and a second or lower position wherein the light reflecting means is spaced beneath the lower end so that light entering the upper end is dispersed at the lower end.

In the preferred embodiment, the float member 30 is constructed so as to be buoyed by the oil to the first or upper position when the oil is at an adequate level, such as at or above the level indicated in FIG. 2. The float member 30 is also constructed so to drop to the second or lower position when the oil is at an inadequate level, such as at or below the level indicated in FIG. 5.

In the preferred embodiment, the float member 30 includes a hollow ring 34 having a generally cylindrical outer wall and inner surface 36 forming a cylindrical bore receiving wall having a at least a part of the lower end of the light transmitting member 16. The float member 30 also includes a plurality of projections 38 extending inwardly from the inner surface 36 and having lower surfaces engageable with the upper surface 23 of the light transmitting member flange 22 to limit downward movement of the float member 30 relative to the light transmitting member 16, as best snown in FIG. 5. The float member 30 also includes an open portion 32 extending downwardly from the hollow ring 34 for supporting the light reflecting means and for allowing fluid to flow between the light reflecting means and the lower surface 26 of the light transmitting member 16 when the light reflecting means is spaced from the lower surface 26.

In the preferred embodiment, the open portion 32 includes a generally horizontal plate 41 supported by four tabs 40 extending downwardly from the ring 34 and defining openings 43 (FIG. 5).

Preferably, the light reflecting means includes a light reflecting disc 42 supported in the open portion 32 of the float member 30 so as to extend generally horizontally or perpendicularly to the longitudinal axis 18 of the light transmitting member 16. The light reflecting disc 42 preferably has a chrome plated upper surface.

The fluid level indicator 14 operates as follows: When the float member 30 is in the first or upper position due to an adequate amount of oil in the assembly 12, the light reflecting disc 42 engages or is adjacent the lower surface 26 of the lower end of the light transmitting member 16, while oil contacts the upper surface 24 of the lower end of the light transmitting member 16. Accordingly, light entering the upper end of the light transmitting member 16 and transmitted to the lower surface 26 is reflected by the light reflecting disc 42, while light transmitted to the upper surface 24 is dispersed because of the oil contacting the upper surface 24. This causes appearance at the upper end of the light transmitting member 16 of a light area having the oil drop shape of the lower surface 26 surrounded by a dark area having the shape of the upper surface 24, as shown in FIG. 3. When the float member 30 is in the second or lower position due to an inadequate amount of oil in the assembly 12, the light reflecting disc 42 is spaced below the lower surface 26 of the lower end of the light transmitting member 16. This causes appearance at the upper end of the light transmitting member 16 of uniform coloration, as shown in FIG. 6.

More particularly, when the oil level is above or just below the lower end of the light transmitting member 16, but not high enough to move the float member 30 upwardly into its upper position, the upper end of the light transmitting member 16 will appear uniformly dark, as shown in FIG. 6. This is because both the upper and lower surfaces 24 and 26 of the lower end of the light transmitting member 16 are contacted by oil or spaced just above the oil, so that almost all of the light transmitted to the lower end of the light transmitting member 16 is dispersed. As the oil drops further below the lower end of the light transmitting member 16, some light may be reflected by the surfaces 24 and 26, since the oil is not immediately adjacent the lower end. This will cause appearance at the upper end of the light transmitting member 16 of lighter but still uniform coloration.

Various of the features of the invention are set forth in the following claims.

I claim:

1. An optical fluid level indicator comprising a light transmitting member having a first end, and a second end adapted to extend into a fluid container, a float including light reflecting means, and means on said float and on said light transmitting member for guiding movement of said float relative to and along said member in response to the level of fluid in the container and for limiting movement of said float relative to said member between a first position wherein, when the fluid in the fluid container is at a predetermined level, said light reflecting means is adjacent said second end of said light transmitting member so as to thereby to reflect from said second end and toward said first end light traveling in said member from said first end toward said second end, and a second position wherein, when the fluid in the fluid container is at a level lower than said predetermined level, said light reflecting means is spaced from said second end of said light transmitting member so as thereby to permit dispersion at said second end of light traveling in said member from said first end toward said second end.

2. An indicator as set forth in claim 1 wherein said light transmitting member extends generally vertically, and wherein said means for guiding movement of said float includes formation of said member with a cylindrical outer surface and formation of said float with a generally cylindrical inner surface forming a cylindrical bore receiving said light transmitting member, and wherein said mean for limiting movement of said float relative to said member includes formation of said member adjacent said second end with a flange having an upper surface, and a plurality of projections extending inwardly from said inner surface and having lower surfaces engagable with said upper surface of said light transmitting member flange to limit downward movement of said float relative to said light transmitting member to said second position, and wherein said float includes an open portion supporting said light reflecting surface and allowing fluid to flow between said light reflecting surface and said second end of said light transmitting member when said light reflecting surface is spaced from said second end.

3. An indicator as set forth in claim 1 wherein said second end of said light transmitting member includes a lower surface generally perpendicular to said longitudinal axis, and wherein said light reflecting surface extends generally perpendicularly to said longitudinal axis.

4. An optical fluid level indicator comprising a light transmitting member having a longitudinal axis, an upper end, a lower end adapted to extend into a fluid container, and a float member having mounted thereon a light reflecting member, said float member being movably connected to said lower end of said light transmitting member for movement relative to said light transmitting member in the direction of said longitudinal axis and in response to fluid level in the container and between a first position wherein, when the fluid is at a first level, said light reflecting member is adjacent said lower end of said light transmitting member so that light entering said upper end of said light transmitting member is reflected from said lower end by said light reflecting member, and a second position wherein, when the fluid is at a second level lower than said first level, said light reflecting member is spaced beneath said lower end so that light entering said upper end is dispersed at said lower end.

5. An indicator as set forth in claim 4 wherein said lower end of said light transmitting member includes a lower surface generally perpendicular to said longitudinal axis, and wherein said light reflecting surface extends generally perpendicularly to said longitudinal axis.

6. An indicator as set forth in claim 4 wherein said light transmitting member includes a generally cylindrical outer surface, and an annular flange extending outwardly from said outer surface adjacent said lower end and having an upper surface, and wherein said float member includes a generally cylindrical inner surface forming a cylindrical bore receiving said light transmitting member, a plurality of projections extending inwardly from said inner surface and having lower surfaces engageable with said upper surface of said light transmitting member flange to limit downward movement of said float member relative to said light transmitting member, and an open portion supporting said light reflecting member and allowing fluid to flow between said light reflecting member and said lower end of said light transmitting member when said light reflecting member is spaced from said lower end.

7. An indicator as set forth in claim 4 wherein said light reflecting member includes a chrome plated surface.

8. An optical fluid level indicator comprising a light transmitting member having a longitudinal axis, an upper end, and a lower end adapted to extend into a fluid container, said lower end including a first surface having a shape, and a portion projecting downwardly from said first surface and forming a second surface spaced beneath said first surface and having a shape, and a float member having mounted thereon light reflecting means, said float member being movably connected to said lower end of said light transmitting member for movement relative to said light transmitting member in the direction of said longitudinal axis and in response to fluid level in the container and between a first position wherein, when the fluid is at a first level, said light reflecting means is adjacent said second surface so that light transmitted to said second surface is reflected by said light reflecting means, thereby causing appearance at said upper end of said light transmitting member of a light area having the shape of said second surface surrounded by a dark area having the shape of said first surface, and a second position wherein, when the fluid is at a second level lower than said first level, said light reflecting means is spaced below said second surface, thereby causing appearance at said upper end of said light transmitting member of uniform coloration.

9. An indicator as set forth in claim 8 wherein said lower end of said light transmitting member includes a lower surface generally perpendicular to said longitudinal axis, and wherein said light reflecting means includes a light reflecting surface extending generally perpendicularly to said longitudinal axis.

10. An indicator as set forth in claim 8 wherein said light transmitting member includes a generally cylindrical outer surface, and an annular flange extending outwardly from said outer surface adjacent said lower end and having an upper surface, and wherein said float member includes a generally cylindrical inner surface forming a cylindrical bore receiving said light transmitting member, a plurality of projections extending inwardly from said inner surface and having lower surfaces engageable with said upper surface of said light transmitting member flange to limit downward movement of said float member relative to said light transmitting member, and an open portion supporting said light reflecting means and allowing fluid to flow between said light reflecting means and said lower end of said light transmitting member when said light reflecting means is spaced from said lower end.

11. An indicator as set forth in claim 8 wherein said light reflecting means includes a chrome plated surface.

12. An optical fluid level indicator comprising a light transmitting member having a longitudinal axis, an upper end, and a lower end adapted to extend into a fluid container, and a float member having mounted thereon light reflecting means, said float member being movably mounted on said lower end of said light transmitting member for movement relative to said light transmitting member in the direction of said longitudinal axis and in response to fluid level in the container and between a first position wherein, when the fluid is at a first level, said light reflecting means is located adjacent to said lower end of said light transmitting member so that light entering said upper end of said light transmitting member is reflected from said lower end by said light reflecting means, and a second position wherein, when the fluid is at a second level lower than the first level, said light reflecting means is located in spaced relation to said lower end so that light entering said upper end is dispersed at said lower end.

13. An indicator as set forth in claim 12 wherein said lower end of said light transmitting member includes a lower surface generally perpendicular to said longitudinal axis, and wherein said light reflecting means includes a light reflecting surface extending generally perpendicularly to said longitudinal axis.

14. An indicator as set forth in claim 12 wherein said light transmitting member includes a generally cylindrical outer surface, and an annular flange extending outwardly from said outer surface adjacent said lower end and having an upper surface, and wherein said float member includes a generally cylindrical inner surface forming a cylindrical bore receiving said light transmitting member, a plurality of projections extending inwardly from said inner surface and having lower surfaces engageable with said upper surface of said light transmitting member flange to limit downward movement of said float member relative to said light transmitting member, and an open portion supporting said light reflecting means and allowing fluid to flow between said light reflecting means and said lower end of said light transmitting member when said light reflecting means is spaced from said lower end.

15. An indicator as set forth in claim 12 wherein said light reflecting means includes a chrome plated surface.

* * * * *